Feb. 10, 1931.  H. J. NEUMILLER  1,792,388
METHOD OF MAKING SPECIAL CONTAINERS
Filed Sept. 8, 1930   2 Sheets-Sheet 1
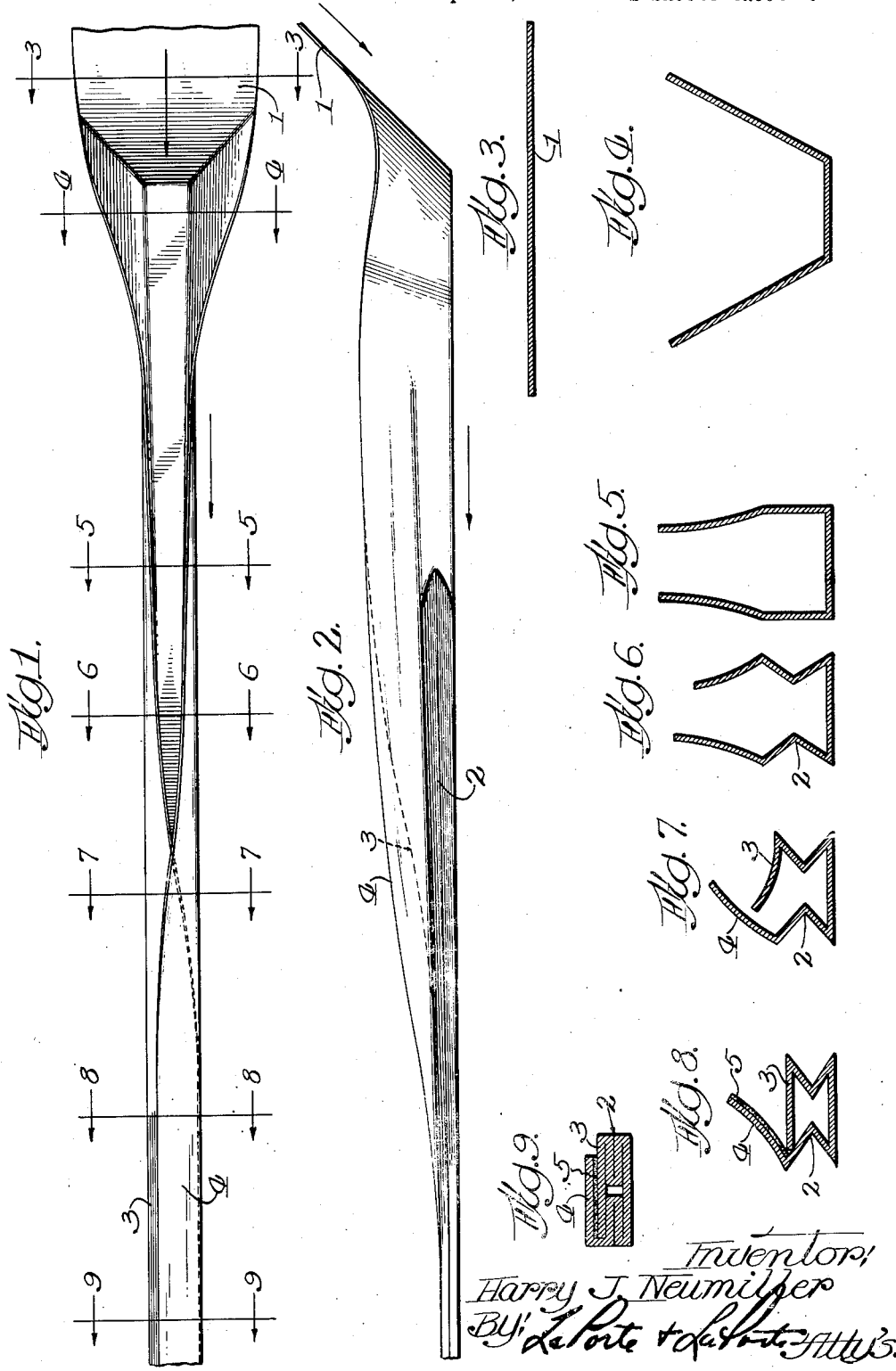

Feb. 10, 1931.  H. J. NEUMILLER  1,792,388
METHOD OF MAKING SPECIAL CONTAINERS
Filed Sept. 8, 1930   2 Sheets-Sheet 2
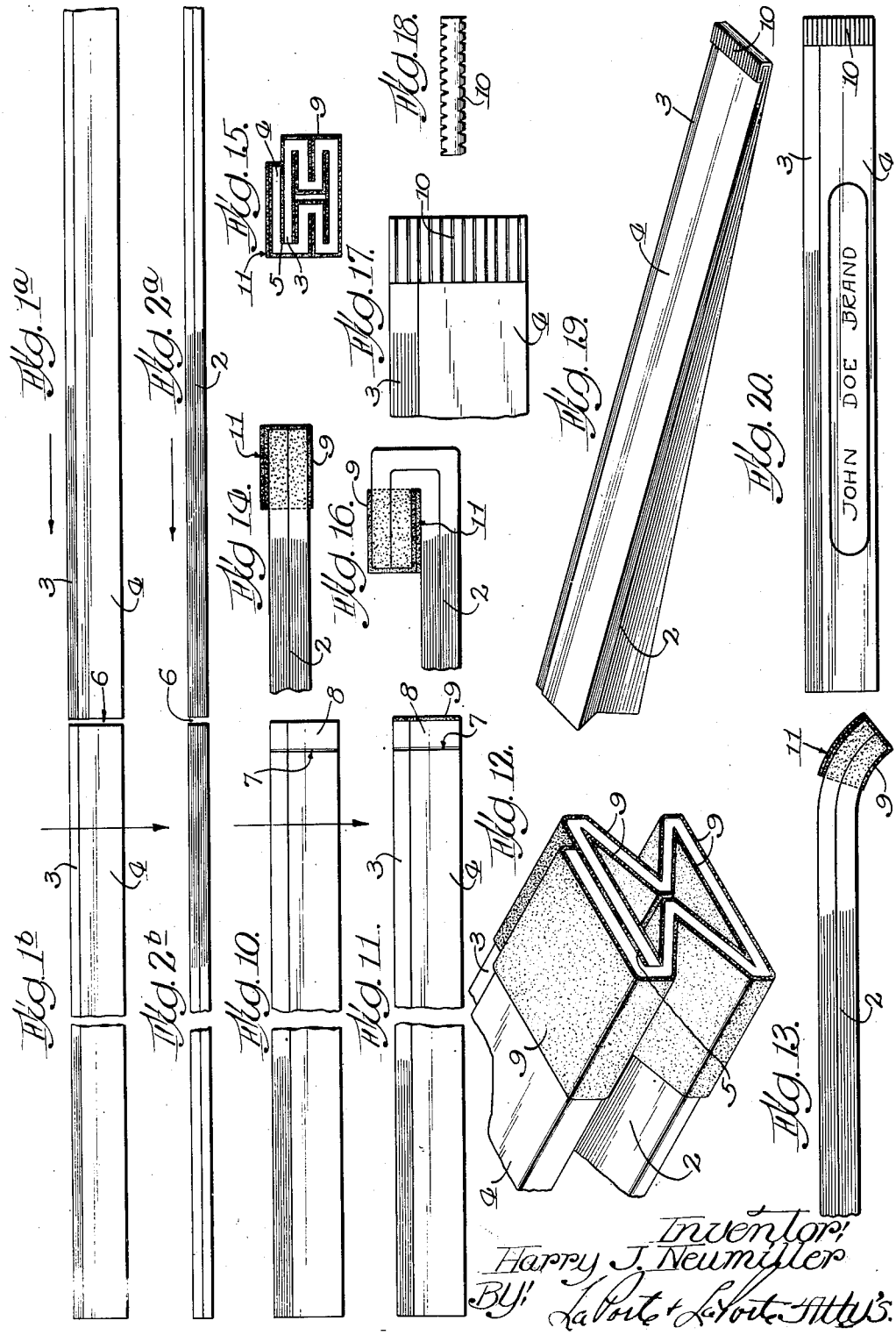

Patented Feb. 10, 1931

1,792,388

UNITED STATES PATENT OFFICE

HARRY J. NEUMILLER, OF PEORIA, ILLINOIS, ASSIGNOR TO HUMITUBE MFG. CO., OF PEORIA, ILLINOIS, A CORPORATION OF ILLINOIS

METHOD OF MAKING SPECIAL CONTAINERS

Application filed September 8, 1930. Serial No. 480,362.

This invention has reference to an improved method of making containers, wrappers or packages comprising the use of a transparent cellulose material having a moisture proof coating or combined with a moisture proofing composition, and especially the sealing of the containers, wrappers or packages to render them advantageous in the merchandising of various articles of trade, as for instance, cigars, tobacco, coffee, tea and edibles wherein it is desired that the sealed end will withstand loading, weight of material loaded, and the strains to which the sealed end will be subjected in the ordinary handling of the filled containers, wrappers or packages.

The invention has for its object the method of producing sealed containers from a continuous sheet or strip of transparent moisture proof cellulose material which consists in continuously feeding forward the sheet or strip and forming the said sheet or strip into package-like form with preferably plicated sides and overlapped edge portions; applying a solvent, such as acetone, to one face of one of said overlapped edge portions and applying pressure with heat to said overlapping portions for effective sealing of the said portions; severing the material so formed into selective length containers applying a solvent, such as acetone, to the edge of one of the open ends of the container and also to the inner and outer surface portions adjacent thereto for a predetermined or selective length thereof; folding over the end of the container to which the solvent has been applied and applying pressure with heat to the end so folded whereby to cause the folded end to be sealed between the surfaces of its plicated sides and between the adjacent surfaces of such folded surfaces and during the steps of folding and applying pressure with heat, undulating the exposed surfaces of the said folded portion whereby to strengthen the folded and sealed end.

The trade is at present familiar with two types of cellulose material, one known as plain transparent material and the other, involved herein and known as moisture proof material. The latter is a cellulose material having a moisture proof coating. Attempts have been made in the use of this moisture proof material to fuse the coating on the plies or layers of the material, but without any great success due to the ineffectiveness of fusing the coating, with the result that containers so sealed will not withstand filling during handling nor the pressure due to weight of material placed in the containers and the sealed ends thereby break away. It is not to be understood, however, that the cellulose material itself is considered too fragile, for such is not the case. I am merely making reference to the fact that fusion of the moisture proof coating is not effective nor sufficient for the purpose of a seal.

I have discovered that in the use of the moisture proof material for the making of containers and the sealing of an end thereof that a very strong and effective bond and seal may be provided by applying a solvent, such as acetone, to the plies or layers of the container, which it is intended to seal and that the application of the solvent will soften or liquefy the coating of the cellulose material, with the result, that the plies or layers of the material will thereby become firmly held together by the merging and adherence of the moisture proof coatings. This merging of the coating is accentuated and intensified by applying pressure with heat. The pressure being desirable since the material is folded on itself to provide a sealed end and pressure will aid in the setting of the turned over portions and the heat acts to evaporate excess solvent with the attending result that the seal may be quickly and effectively made. It is, therefore, an object of the invention to use as a base material for the containers a moisture proof cellulose sheet and employ a solvent, such as acetone, to soften or liquefy the coating on the sheet whereby when the step of sealing is being made the plies or layers of the material may be firmly and effectively held together by the merging and adherence of the moisture proof coating. I have further discovered by undulating the surfaced portions which form the sealed end of the container increases the bonding action through the merging of the moisture proof coating.

The invention further comprehends the scoring of the body of the containers at a predetermined point from the open end of the containers to be sealed whereby to facilitate the folding over of a predetermined length of the container ends to be sealed and finally after the containers have been completed with sealed ends having imprinted thereon a marking to designate the distributor, user and/or trade name, or other marking as may be desired.

Other and further objects will more fully appear from the following description.

That the invention may be more fully understood, reference is had to the accompanying drawings illustrating a preferred embodiment of the invention, in which:

Fig. 1 is a plan view showing a strip of the cellulose material and several of the steps which are performed in the shaping of the material and before the severance of the lengths of the container shapes therefrom;

Fig. 2 is a side elevation of Fig. 1;

Figs. 1a and 2a illustrate extensions of Figs. 1 and 2 to show a portion of the material formed and sealed in container shape and before the selective container lengths have been severed and an end folded and sealed;

Figs. 1b and 2b show in plan and elevation severed lengths of containers, partly broken away as these lengths may have any predetermined length and width when severed from the formed material;

Fig. 3 is a transverse sectional view of a selective width of the cellulose material from which one form of container may be made;

Fig. 4 is a cross-section as the same would appear if taken on the line 4—4, Fig. 1, illustrating a first step in the formation of a specific type of container as shown in Fig. 19;

Figs. 5, 6 and 7 are cross-sections as the same would appear if taken on the lines 5—5; 6—6; and 7—7, respectively, of Fig. 1 and illustrate successive steps in the method of forming the material into container shape and particularly one such as shown in Fig. 19;

Fig. 8 is a cross-section as the same would appear if taken on the line 8—8 of Fig. 1 and is representative of that portion of the formed length of material where the solvent is applied to one of the overlapping edges of the formed material included in the step of sealing such edges;

Fig. 9 is a cross-section as the same would appear if taken on the line 9—9, Fig. 1, and illustrates the form the material assumes for a specific type of container and the sealing of the overlapping edges;

Figs. 10 and 11 are plan views, respectively, of the formed material in a specific type of container showing scoring in the one instance to determine the length of the folded over end portion which is to be sealed and in the other instance the scoring as well as the initial applying of the solvent to the end of the container, which said solvent as illustrated in Fig. 12 by capillarity covers the scored end of the container;

Fig. 12 is a perspective of the end of a severed container length before the end to be sealed is folded over and showing the solvent applied thereto;

Fig. 13 is a view showing the end of the container to be sealed with solvent applied thereto and a step in the method where an additional amount of solvent is applied to the surface which is folded over when the end of the container is folded to be sealed;

Fig. 14 is a view of the end of the container to be folded with the solvent applied and before the fold is made;

Fig. 15 is an end view of Fig. 14;

Fig. 16 is a view of the solvent treated end of the container when folded over and just prior to or simultaneous with the step of applying pressure with heat, whereby to set the folded end and to seal by the merging of the coatings treated with the solvent and when the excess solvent is evaporated by the heat to insure quick sealing;

Fig. 17 is a detail of the completed folded and sealed end of a container after having its surfaces undulated whereby to strengthen and reenforce said folded and sealed end;

Fig. 18 is an end view of Fig. 17;

Fig. 19 is a perspective view of a specific type of container especially adapted for receiving a single piece of merchandise, as for example, a cigar, and having a folded and sealed end, overlapping sealed portions and plicated sides, and Fig. 20 is a plan view of a container such as shown in Fig. 19 on which has been applied or imprinted the name of a manufacturer or distributor or specific trade name branding.

Attention is called to the fact that the cellulose strip or sheet is very, very thin and that the views illustrating not only the completed article itself but the various steps in the formation of the same from a sheet or strip are somewhat out of proportion which is made necessary whereby to graphically illustrate the sheet or strip, the various steps and the overlying or folded over portions of the material during the process of forming containers from the sheet material.

Like characters of reference denote corresponding parts throughout the figures.

I desire to call attention to the Charch et al. Patent No. 1,737,187, dated November 26th, 1929, for a moisture-proof material for the purpose of identifying the general nature of moisture proof material from which the containers are produced by the method therein described and the coating of which therein identified, which is employed when treated with the solvent for sealing by merging of the coating which is softened or liquefied by the application of such solvent.

In Figs. 1, 1ª, 2 and 2ª, considered together as diagrammatic plan views and elevations, show the strip or sheet 1 of preferably moisture proof coated cellulose material supplied preferably in continuous length from which the completed container in Fig. 19 is made by a series of successive steps during the movement of the sheet or strip 1 in a forward direction. The formation of the sheet or strip 1 into container shape, as for example that shown in Fig. 19, (which is illustrative only and not intended as limiting the shape or design of container to be made) is brought about by the material being formed over a mandrel or other suitable former from a flat strip or sheet to the container-like form as it appears in Figs. 1ª and 2ª.

I have elected to show the material during the formation thereof into container shape as being formed with the plicated sides 2. This form is desirable but not necessarily essential since containers may be made without plicated sides, as will be understood.

The several steps in the formation of the material into container shape and from which selective container lengths are severed is best seen in Figs. 1, 2, 4, 5, 6 and 7, which will produce a container shape having the plicated sides 2 and the overlapping portions 3 and 4 to provide the longitudinal seam which is sealed throughout the length of the container, as shown in Fig. 9. To provide the seal for the overlapping portions 3 and 4, there is applied to the under surface of the portion 4 during the movement of the sheet or strip 1 and the formation thereof, of a solvent 5, such, for instance, as acetone. The solvent being applied direct to the coated surface of the material will soften and liquefy the coating and an effective seal made between the contiguous surfaces of the portions 3 and 4 by bringing the surfaces into juxtaposition and applying pressure thereto to make the seal effective by the merging of the coating on the contiguous surfaces of the portions 3 and 4. Heat is preferably applied with the pressure which acts to evaporate excess solvent and insure the quick setting and sealing of the merged coating. The steps described in the formation of the sheet or strips 1 to container shape is successively and progressivey carried on during the forward movement of said sheet or strip material and following the step of sealing the overlapping portions 3 and 4, containers of selective length are severed from the shaped material. Such lengths are shown, although broken away, in Figs. 1ᵇ, 2ᵇ, 10 and 11 and the point of severance is indicated at 6 between the Figs. 1ª and 1ᵇ and between the Figs. 2ª and 2ᵇ. I prefer after the severance of the container lengths from the formed or shaped material to move the container lengths in a direction transverse to the movement of the sheet or strips during the forming operations thereof. This movement is illustrated by the arrangement shown in Figs. 1ª and 2ª and Figs. 1ᵇ, 2ᵇ, 10 and 11. As the individual container lengths are moved they are preferably scored at 7 at a predetermined distance from one open end of such containers and the said scoring is indicative of the point of folding the end 8 of the container on itself whereby to provide the sealed end. Following the scoring step and while the containers are in movement, a solvent 9, such as acetone, is applied to the edge of the open edge portion 8 of the respective containers which by capillarity or similar action creeps in, along and over the interior and exterior surfaces of the end portion 8 of the container, the solvent 9 wetting the innermost creases and crevices formed by the plies or layers of the container in the collapsing and folding thereof; the solvent application being sufficiently light in quantity to insure the capillary action not carrying the solvent beyond the scoring 7. This solvent is applied just preceding the step of folding over the end 8 on the scoring 7 and is for the purpose of softening or liquefying the moisture proof coating on the plies and surface portions of the portion 8 of the containers so that when the portion 8 is folded over, and it is immediately, and by applying pressure the contiguous surfaces of the material which are pressed into juxtaposed relation are firmly sealed and held together by the merging of the softened or liquefied coating. I prefer when applying the pressure to apply it with heat which latter is employed to evaporate excess solvent and thereby bring about a quickening in the step of forming and completing the seal. During the application of pressure with heat I preferably undulate the exposed surfaced portions of the seal as at 10 which not only creates a better bond but gives added strength and stiffens the said sealed end.

I have previously pointed out that in Fig. 19 there is illustrated a specific form of container. This form will receive articles of merchandise but has been designed preferably for holding a single cigar and when the container is so filled its open and unsealed end may be folded over as is now a common practise. Referring to Figs. 13, 14, 15 and 16 it is to be observed that on one surface of the container there is shown a greater thickness or quantity of the solvent application designated 11. This applied solvent is not dependent upon capillarity in the solvent applied to the end edges of the container but is purposely applied so that immediately when the treated end is folded over and brought into contact with the untreated solvent surface of the body of the container there will be a sufficient solvent between these contiguous surfaces whereby to soften the coating on both the treated solvent coated surface and unsolvent treated surface to insure a mergence and effective adhesion between the merged moisture proof coatings thereon. Such seal is made the more effective by the application of pressure to the folded ends which acts also to set the folded ends and by applying heat with the pressure the excess solvent will be evaporated and insure a quick seal. Although not shown, one manner in which a solvent is to be applied to the edge of the open end of the containers is by passing the same across a revolving surface in association with a receptacle containing the solvent and it would be provided that as the solvent treated end of the container left the revolving surface, one surface portion of the container would wipe across such revolving surface and receive the excess coating 11. This action would tend to turn the treated end of the container, as shown in Fig. 13, but without any injurious effect, as it will again assume the flat position shown in Fig. 14 when the treated end will be immediately folded over as indicated in Fig. 16.

On the completion of the container having the folded and sealed end, as shown in Fig. 19, the containers may be successively passed beneath or over a suitable branding device where the name of the manufacturer or distributor may be applied, as shown in Fig. 20, or a suitable marking as, for example, a trade name may be imprinted on the surface of the container.

By the application of a solvent, such, for instance, as acetone, to the surfaces of a cellulose sheet or strip of the type hereinabove referred to, the solvent acts to soften and dissolve the moisture proofing composition combined with the cellulose material resulting in the composition forming an adhesive which, when the treated surfaces are brought into contiguous relation, the softened and dissolved composition, being the adhesive, merges or interpenetrates and forms a seal, with or without pressure, but when pressure is applied will accentuate the seal which is naturally desirable in a continuous operation as herein pointed out. Heat, when applied with the pressure, as pointed out, acts as an evaporator for the solvent and thereby further hastens or speeds up the sealing operation.

I desire to point out that instead of applying a solvent with heat and pressure, as described, an adhesive may be used. This adhesive may be nitro-cellulose, with or without added gums, waxes and plasticizers or other materials dissolved in a suitable solvent, such as acetone. When such an adhesive is used, the heating operation may be omitted since an excess of solvent is not present. The solvent in the adhesive should preferably have a softening action on the moisture proof composition to secure better adhesion of the treated surfaces due to a better merging or interpenetration of the composition and adhesive. The solvent may have varying amounts of some or all of the constituents of the moisture proof composition or other suitable adhesive material dissolved in it. The amount should be insufficient to prevent the capillary action previously referred to.

I will not claim herein my invention comprising, broadly, a wrapper or container having its reinforced and sealed end corrugated and created in the absence of the use of a solvent inasmuch as such an article and the method of its production more properly constitute subjects-matter to be claimed in my earlier application, Serial No. 470,483, filed July 24, 1930. Nor will I claim herein my invention comprising the wrapper or container as an article of manufacture in as much as the same constitutes subject matter for a separate application.

What I claim is:—

1. The method of making sealed containers from an endless sheet of transparent cellulose material combined with a moisture proof composition; which consists in forming the sheet into container shape having sides and with overlapping edges; sealing said overlapping edges; successively severing the formed sheet into selective size containers; applying a solvent for said moisture proof composition to the edge of one open end to wet the surface portions of the container for a predetermined distance adjacent said open end; folding over the end of the container so treated with solvent and applying pressure with heat; the pressure acting to fix the folded end portion while at the same time the plies and adjacent surfaces of the material are firmly sealed by the merging of the moisture proofing of the contiguous surfaces so treated with the solvent and the heat acting to vaporize excess solvent and cause a quick effective seal within the area of such folded end and undulating the surfaces of said folded portions whereby to strengthen the bond of the folded and sealed end.

2. The method of forming a closure for the opening of a container made from transparent cellulose material combined with a moisture proof composition, which consists in applying to the surfaces of the material adjacent the opening a solvent which acts to dissolve the composition on the material whereby to provide an adhesive of the composition and seal said adjacent surfaces so treated when brought into contiguous relation.

3. The method of facilitating the formation and sealing of containers formed of material having a soluble moisture-proofing constituent, comprising the applying of a solvent to opposite edge portions thereof to affect the soluble moisture-proofing constituent on meeting faces adapted to constitute a closure of the container, and then pressing said portions together to effect in part the container formation and to cause the soluble moisture-proofing constituent on said meeting faces to merge whereby to create a seal.

4. The method of sealing the ends of wrappers formed of material having a soluble moisture-proofing constituent, comprising the applying of a solvent interiorly of said end to affect the soluble moisture-proofing constituent over the inner face of said end, and then pressing said end together to cause the soluble moisture proofing constituent on opposite faces of said end to merge whereby the end will be completely sealed.

5. The method of sealing the ends of wrappers formed of material having a soluble moisture-proofing constituent, comprising the applying of a solvent interiorly of said end to affect the soluble moisture-proofing constituent over the inner face of said end, and then pressing said end together to cause the soluble moisture proofing constituent on opposite faces of said end to merge whereby the end will be completely sealed, and strengthening said sealed end by forming the same into a multiplicity of closely related corrugations thereacross interfitting the opposite faces of the wrapper together.

6. The method of sealing the ends of wrappers formed of material having a soluble moisture proofing constituent, comprising the applying of a solvent interiorly of said end to affect the soluble moisture proofing constituent over the inner face of said end, and then pressing said end together to cause the soluble moisture proofing constituent on opposite faces of said end to merge whereby the end will be completely sealed, also applying solvent to an exterior face of the wrapper, and folding over and securing the sealed end by pressing the same upon the body of the wrapper.

7. The method of sealing the ends of wrappers formed of material having a soluble moisture proofing constituent, comprising the applying of a solvent interiorly of said end to affect the soluble moisture proofing constituent over the inner face of said end, and then pressing said end together to cause the soluble moisture proofing constituent on opposite faces of said end to merge whereby the end will be completely sealed, also applying solvent to an exterior face of the wrapper, and folding over and securing the sealed end by pressing the same upon the body of the wrapper, and strengthening said sealed end by forming the same and adjacent body portion into a multiplicity of closely related corrugations thereacross interfitting the end and body portion together.

8. The method of sealing the ends of wrappers formed of material having a soluble moisture proofing constituent, comprising the flattening of the end to be sealed to bring opposite walls of the wrapper into close proximity, and applying a solvent at the edge of said end whereby capillarity will assist in causing the solvent to affect the soluble moisture proofing constituent in the innermost recesses caused by the flattening of the end portion as well as the interior faces thereof, then pressing said faces together whereby the soluble moisture-proofing constituent is merged throughout and the end completely sealed.

9. The method of sealing the ends of wrappers formed of material having a soluble moisture proofing constituent, comprising the flattening of the end to be sealed to bring opposite walls of the wrapper into close proximity, and applying a solvent at the edge of said end whereby capillarity will assist in causing the solvent to affect the soluble moisture proofing constituent in the innermost recesses caused by the flattening of the end portion as well as the interior faces thereof, then pressing said faces together whereby the soluble moisture proofing constituent is merged throughout and the end completely sealed, and strengthening said sealed end by forming the same into a multiplicity of closely related corrugations thereacross interfitting the opposite faces of the wrapper together.

10. The method of sealing the ends of wrappers formed of material having a soluble moisture proofing constituent, comprising the flattening of the end to be sealed to bring opposite walls of the wrapper into close proximity, and applying a solvent at the edge of said end whereby capillarity will assist in causing the solvent to affect the soluble moisture proofing constituent in the innermost recesses caused by the flattening of the end portion as well as the interior faces thereof, then pressing said faces together whereby the soluble moisture proofing constituent is merged throughout and the end completely sealed, also applying solvent to an exterior face of the wrapper, and folding over and securing the sealed end by pressing the same upon the body of the wrapper.

11. The method of sealing the ends of wrappers formed of material having a soluble moisture proofing constituent, comprising the flattening of the end to be sealed to bring opposite walls of the wrapper into close proximity, and applying a solvent at the edge of said end whereby capillarity will assist in causing the solvent to affect the soluble moisture proofing constituent in the innermost recesses caused by the flattening of the end portion as well as the interior faces thereof, then pressing said faces together whereby the soluble moisture proofing constituent is merged throughout and the end completely sealed, also applying solvent to an exterior face of the wrapper, and folding over and securing the sealed end by pressing the same upon the body of the wrapper, and strengthening said sealed end by forming the same and adjacent body portion into a multiplicity of closely related corrugations thereacross interfitting the end and body portion together.

12. The method of sealing the ends of wrappers formed of material having a soluble moisture-proofing constituent, comprising the applying of a solvent interiorly of said end to affect the soluble moisture-proofing constituent over the inner face of said end, and then pressing said end together to cause the soluble moisture proofing constituent on opposite faces of said end to merge whereby the end will be completely sealed, and evaporating excess solvent by subjecting the latter to a quickly effective evaporating medium.

13. The method of sealing the ends of wrappers formed of material having a soluble moisture proofing constituent, comprising the flattening of the end to be sealed to bring opposite walls of the wrapper into close proximity, and applying a solvent at the edge of said end whereby capillarity will assist in causing the solvent to affect the soluble moisture proofing constituent in the innermost recesses caused by the flattening of the end portion as well as the interior faces thereof, then pressing said faces together whereby the soluble moisture-proofing constituent is merged throughout and the end completely sealed, and evaporating excess solvent, by subjecting the latter to a quickly effective evaporating medium.

14. The method of sealing the end of wrappers formed of material having a soluble moisture proofing constituent, comprising the applying of a solvent interiorly of said end to affect the soluble moisture proofing constituent over the inner face of said end, and then pressing said end together to cause the soluble moisture proofing constituent on opposite faces of said end to merge whereby the end will be completely sealed, also applying solvent to an exterior face of the wrapper, folding over and securing the sealed end by pressing the same upon the body of the wrapper, and evaporating excess solvent by subjecting the latter to a quickly effective evaporating medium.

15. The method of sealing the end of a wrapper formed of material having a soluble moisture proofing constituent comprising scoring the body of the wrapper at a predetermined point removed from the end to be sealed, and applying a solvent interiorly of the wrapper between said scoring and the end to be sealed, and pressing said end together to cause the moisture proofing constituent to merge throughout whereby the end will be completely sealed.

16. The method of sealing the end of a wrapper formed of material having a soluble moisture proofing constituent comprising scoring the body of the wrapper at a predetermined point removed from the end to be sealed, and applying a solvent interiorly of the wrapper between said scoring and the end to be sealed, pressing said end together to cause the moisture proofing constituent to merge throughout whereby the end will be completely sealed, and folding said sealed end on the line of scoring over onto the body and securing the same to the body.

In witness whereof, I have hereunto set my hand this 5th day of September 1930.

HARRY J. NEUMILLER.